(12) United States Patent
Boucadair et al.

(10) Patent No.: US 12,034,701 B2
(45) Date of Patent: Jul. 9, 2024

(54) METHODS FOR PROTECTING A CLIENT DOMAIN, CORRESPONDING CLIENT NODE, SERVER AND COMPUTER PROGRAMS

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 505 days.

(21) Appl. No.: 17/279,995

(22) PCT Filed: Sep. 26, 2019

(86) PCT No.: PCT/FR2019/052281
§ 371 (c)(1),
(2) Date: Mar. 25, 2021

(87) PCT Pub. No.: WO2020/065234
PCT Pub. Date: Apr. 2, 2020

(65) Prior Publication Data
US 2022/0038429 A1  Feb. 3, 2022

(30) Foreign Application Priority Data
Sep. 28, 2018 (FR) ...................... 1859045

(51) Int. Cl.
*H04L 9/40* (2022.01)
*H04L 61/4511* (2022.01)
*H04L 61/4541* (2022.01)

(52) U.S. Cl.
CPC ...... *H04L 63/0263* (2013.01); *H04L 61/4511* (2022.05); *H04L 61/4541* (2022.05);
(Continued)

(58) Field of Classification Search
CPC ............ H04L 63/0263; H04L 61/4511; H04L 61/4541; H04L 63/1408; H04L 63/1458; H04L 63/20; H04L 47/10
See application file for complete search history.

(56) References Cited

U.S. PATENT DOCUMENTS 9,935,877 B2 * 4/2018 Bournelle ............... H04L 45/74
10,686,752 B2 * 6/2020 Boucadair ........... H04L 61/5061
(Continued)

FOREIGN PATENT DOCUMENTS

CN       101141304 A       3/2008

OTHER PUBLICATIONS

Notification under Article 94(3) EPC dated Mar. 22, 2023 for corresponding European Application No. 19806015.4.
(Continued)

*Primary Examiner* — J. Brant Murphy
(74) *Attorney, Agent, or Firm* — David D. Brush; Westman, Champlin & Koehler, P.A.

(57) ABSTRACT

A method for protecting a client domain, for example against a computing attack, implemented in a client node of the client domain. The method includes: discovering at least one other client node of the client domain, called a discovered node; detecting a conflict between at least two management rules for the traffic associated with the client domain; and resolving the detected conflict, including: if one of the rules was installed by a the discovered node, modifying the rule or a state associated with the discovered node; and otherwise, obtaining, from a the discovered node, an item of information for identifying at least one node of the client domain that installed one of the rules; and detecting and/or resolving the conflict using information obtained during the discovery of the at least one other node of the client domain.

16 Claims, 10 Drawing Sheets

(52) U.S. Cl.
CPC ...... *H04L 63/1408* (2013.01); *H04L 63/1458* (2013.01); *H04L 63/20* (2013.01)

(56) References Cited

U.S. PATENT DOCUMENTS

| | | | | |
|---|---|---|---|---|
| 2013/0036102 | A1* | 2/2013 | Goyal | G06N 5/027 707/694 |
| 2016/0119231 | A1* | 4/2016 | Bournelle | H04L 61/5007 370/389 |
| 2016/0219016 | A1* | 7/2016 | Boucadair | H04L 61/5007 |
| 2016/0241445 | A1 | 8/2016 | Kim | |

OTHER PUBLICATIONS

Reddy, T. et al., "Distributed Denial-of-Service Open Threat Signaling (DOTS) Signal Channel Specification", draft-ietf-dots-signal-channel-17, Jan. 22, 2018.

Boucadair, M. et al., "Distributed Denial-of-Service Open Threat Signaling (DOTS) Data Channel", draft-ietf-dots-data-channel-11, Dec. 18, 2017.

English translation of the Written Opinion of the International Searching Authority dated Jan. 15, 2020 for corresponding International Application No. PCT/FR2019/052281, filed Sep. 26, 2019.

International Search Report and Written Opinion dated Jan. 8, 2020 for corresponding International Application No. PCT/FR2019/052281, filed Sep. 26, 2019.

Reddy T. et al., "Distributed Denial-of-Service Open Threat Signaling (COTS) Signal Channel Specification; draft-ietf-dots-signal-channel-25.txt", Distributed Denial-of-Service Open Threat Signaling DOTS Signal Channel Specification; Draft-IETF-COTS-Signal-Channel-25.txt; Internet-Draft; DOTS, Internet Engineering Task Force, IETF; Standardworkingdraft, Internet Society (ISOC) 4, Rue Des Fala, No. 25, Sep. 5, 2018 (Sep. 5, 2018), pp. 1-90, XP015128447.

Boucadair M. et al., "Distributed Denial-of-Service Open Threat Signaling (DOTS) Data Channel Specification; draft-ietf-dots-data-channel-21.txt", Distributed Denial-of-Service Open Threat Signaling (DOTS) Data Channel Specification; Draft-IETF-DOTS-Data-Channel-21.txt; Internet-Draft: DOTS, Internet Engineering Task Force, IETF; Standardworkingdraft, Internet Society (ISOC) 4, Rue Des Falaises, No. 21, Sep. 10, 2018 (Sep. 10, 2018), pp. 1-68, XP015128486.

Boucadair et al., "Distributed Denial-of-Service Open Threat Signaling (DOTS) Server Discovery; draft-boucadair-dots-server-discovery-04.txt", Distributed Denial-of-Service Open Threat Signaling (DOTS) Server Discovery;raft-boucadair-dots-server-discovery-04.txt; Internet-draft: Network Working Group, Internet Engineering Tesk Force, IETF; Standardworkingdrfaft, Internet Society (ISOC) 4, No. 4, Apr. 8, 2018 (Apr. 8, 2018), pp. 1-25, XP015125879.

* cited by examiner

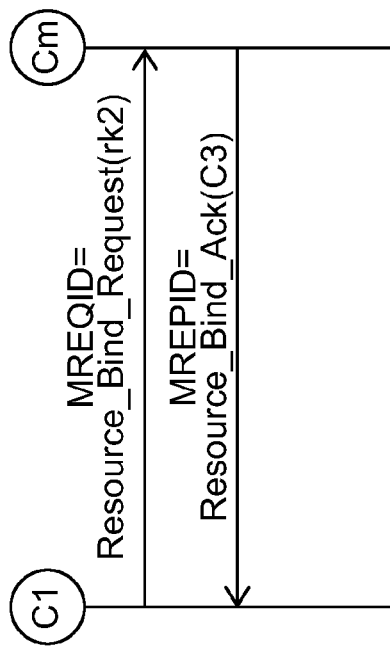
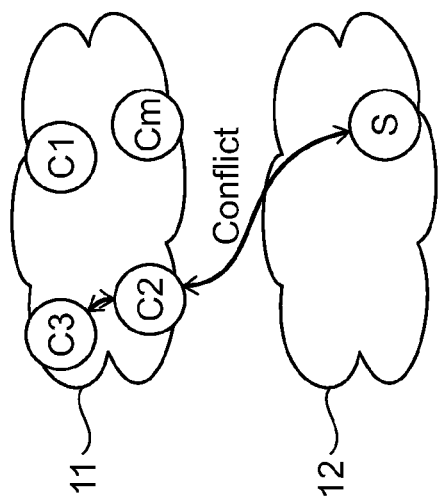
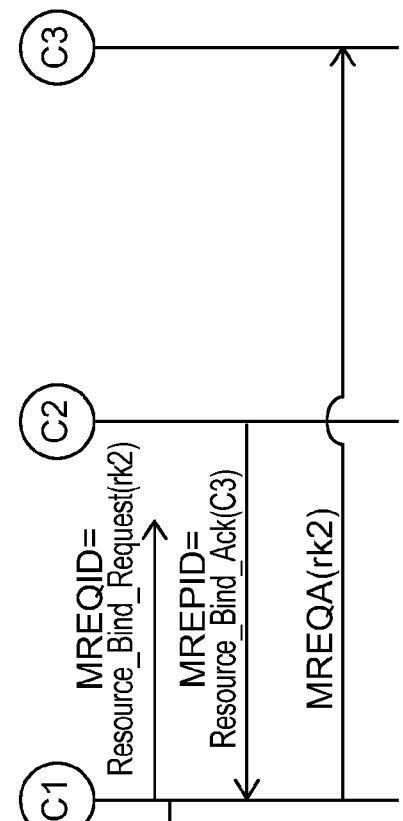
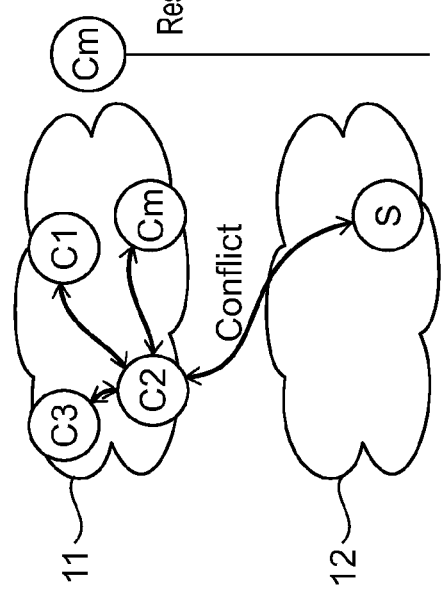
Fig. 8A
Fig. 8B

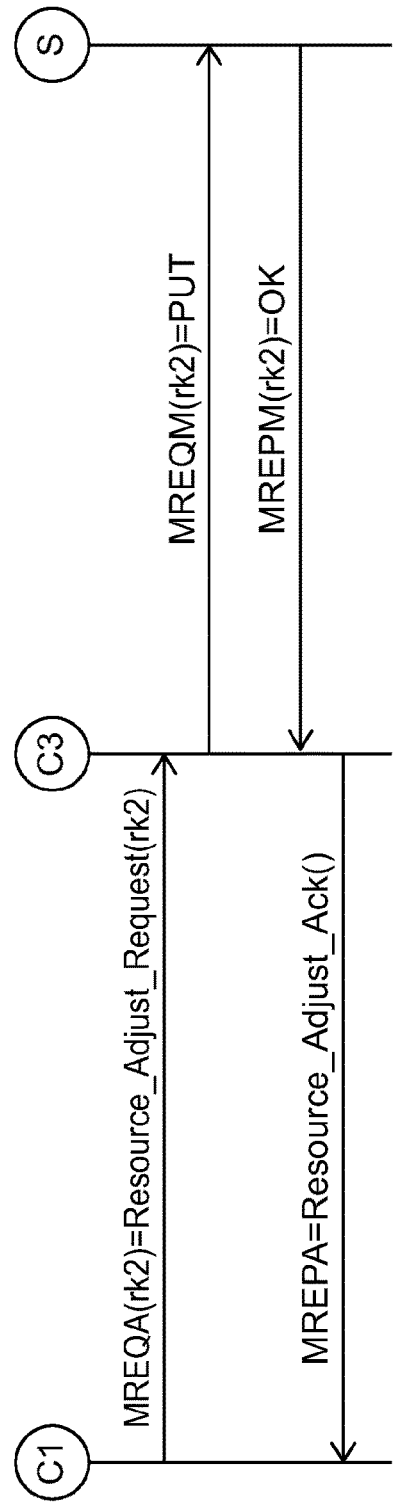
Fig. 9A
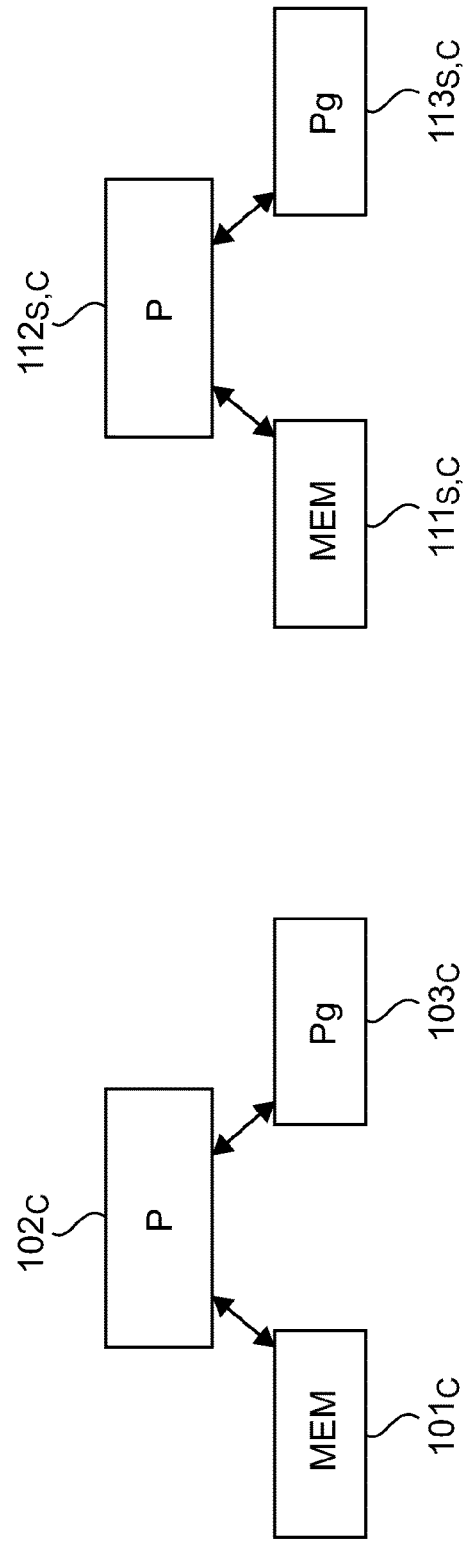
Fig. 11
Fig. 10

METHODS FOR PROTECTING A CLIENT DOMAIN, CORRESPONDING CLIENT NODE, SERVER AND COMPUTER PROGRAMS

CROSS-REFERENCE TO RELATED APPLICATIONS

This Application is a Section 371 National Stage Application of International Application No. PCT/FR2019/052281, filed Sep. 26, 2019, the content of which is incorporated herein by reference in its entirety, and published as WO 2020/065234 on Apr. 2, 2020, not in English.

1. FIELD OF THE INVENTION

The field of the invention is that of communications within a communication network, for example an IP network, and in particular that of added-value IP services.

More specifically, the invention provides a solution for managing the traffic associated with a client domain, i.e. the traffic entering a client domain or leaving a client domain, even in case a conflict is detected between management rules.

In particular, the invention provides a solution enabling a client node to discover the other client nodes within a client domain, to detect a conflict between two network traffic management rules associated with the client domain, and to initiate a conflict resolution action using the information resulting from the discovery.

In particular, the invention has applications in the field of mitigating Distributed Denial of Service (DDoS) attacks, for example, by implementing, but exclusively, a DDoS Open Threat Signaling (DOTS) architecture, as standardized by the IETF.

2. PRIOR ART AND ITS DISADVANTAGES

As a reminder, a DDoS attack is an attempt to make resources, for example network or computing resources, unavailable to their users. Such attacks can be massively deployed by compromising a large number of hosts, and using these hosts to amplify the attacks.

In order to mitigate these DDoS attacks, DDoS attack detection and mitigation services are offered by some access or service providers to their customers. Such mitigation services (DDoS Protection Services) can be hosted within the infrastructures operated by the access providers or in the cloud. In particular, they make it possible to distinguish between "legitimate" traffic, i.e. data consented to by the user, and "suspicious" traffic.

When a DPS-type service is hosted in the cloud, it is difficult to identify a DDoS attack in advance, because such a service is not present on the routing paths (by default) used to reach the network that is the victim of a DDoS attack.

To solve this problem, it has notably been proposed to set up tunnels to force the traffic (incoming or outgoing) onto a site or network to be inspected by the DPS service. However, this approach significantly increases the latency observed by the users and imposes constraints on the sizing of the DPS service to be able to handle all incoming or outgoing traffic from all the users of the network. Moreover, said tunnels are considered as potential attack vectors.

When a DPS-type service is hosted within an infrastructure operated by an access provider, even if the DPS service is present in the routing path of incoming or outgoing traffic of a network, difficulties may arise in identifying suspicious traffic. In particular, with the increase in encrypted traffic, especially carried on UDP (for example, QUIC traffic "Quick UDP Internet Connection"), it is difficult to distinguish legitimate traffic from suspicious traffic. The difficulty of accessing plain text control messages, such as the "SYN/SYN-ACK/ACK" messages provided for in the TCP protocol, can indeed make verification of a network node's consent to receive traffic complex.

In order to help identify suspicious traffic, a specific architecture is being standardised within the IETF. Such an architecture, called DOTS, allows a client node, called a DOTS client, to inform a server, called a DOTS server, that it detected a DDoS attack and that appropriate actions are required.

When a client domain is the target of a DDoS attack, a DOTS client that is part of that client domain can send a message to the DOTS server asking for help. The latter coordinates with a mitigator to ensure that suspicious traffic associated with the denial of service attack is no longer routed to the client domain, while legitimate traffic continues to be routed normally to the client domain.

The DOTS architecture is based on the use of two communication channels between a DOTS client and a DOTS server:

a DOTS Signal Channel, and
a DOTS Data Channel.

The DOTS signal channel is only used when a DDoS attack is in progress. Thus, a DOTS client can use this channel to request help from the DOTS server. For example, a DOTS client uses the signal channel to send a request to the server informing it that the prefix "1.2.3.0/24" is under a DDoS attack, so that the server can take action to stop the attack. Such a request is associated with a DOTS client identified by a unique identifier, noted for example CUID ("Client Unique IDentifier").

A DOTS server can thus take appropriate action to stop a DDoS attack if the request from the DOTS client does not conflict with other requests from other clients in the same client domain, or with a filter rule previously installed by the server upon request of another client of the same client domain, and if the server is enabled/configured to honuor the last request received. In the event of conflict, the server can send an error message, for example of type 4.09 ("Conflict"), to inform the client.

Such a signal channel is notably described in the document "*Distributed Denial-of-Service Open Threat Signaling (DOTS) Signal Channel Specification*", draft-ietf-dots-signal-channel, Reddy, T. et al., January 2018.

The DOTS data channel is used when no DDoS attack is detected by a DOTS client. For example, a DOTS client can use this channel to install filter rules, such as filtering the traffic received from certain addresses or that destined for a given node, or to ask the server to block all the traffic to the prefix "1.2.3.0/24" or all the traffic according to the UDP (User Datagram Protocol) communication protocol to port 443, commonly used for the denial of service attacks.

The DOTS server can install filter rules in response to a request from a client, if that request does not conflict with other requests from other clients in the same client domain or with an existing filter rule. If there is a conflict with other rules maintained by the DOTS server, the server may send an error message, for example, of type 409 ("Conflict"), to inform the client.

Such a data channel is notably described in the document "*Distributed Denial-of-Service Open Threat Signaling (DOTS) Data Channel*", draft-ietf-dots-data-channel, Boucadair, M. et al., December 2017.

According to the procedure described in the two above-mentioned documents, there is a risk that a DOTS server may refuse to process an attack mitigation request sent by a DOTS client when the attack is real, or refuse filtering requests sent by a DOTS client (one purpose of filtering requests being to anticipate DDoS attacks). Such a refusal can occur, for example, when DOTS clients of the same client domain have previously asked the server to install filter rules, but these rules are no longer justified, because they are stale. It can be for example a DOTS client that does not delete the filter rules that were installed on its request before disconnecting.

Yet it is impossible for another client of the same domain to delete these rules and the client at the origin of the attack mitigation request has no information about the identity of the client that installed these rules.

In addition, if a DOTS client becomes inactive or disconnected, a DOTS server may delete all the filters activated by that client, which may interfere with the proper routing of the traffic associated with the client domain in which said client was located, especially since the other clients of the domain are not aware of the existence of these filters and therefore cannot maintain or delete the states corresponding to these filters.

There is therefore a need for a new technique for managing the traffic associated with a client domain, enabling for example to improve the mutual awareness of the DOTS clients of the same domain and, consequently, to improve the coordination of their traffic management actions.

3. SUMMARY OF THE INVENTION

The invention addresses this need by providing a new solution for protecting a client domain, for example against a computing attack, implemented in a client node of the client domain, said method comprising:
  discovering at least one other client node of said client domain, called a discovered node;
  detecting a conflict between at least two management rules for the traffic associated with said client domain; and
  resolving the detected conflict, comprising:
    if one of said rules was installed by the discovered node, modifying said rule or a state associated with said discovered node;
    otherwise, obtaining, from said discovered node, an item of information for identifying at least the node of the client domain that installed one of said rules.

The invention is based on the discovery by a first client node of the other client nodes of the domain and on the use of the information obtained during this discovery to detect a conflict between management rules or to resolve the conflict.

The discovery can be performed on the basis of information spontaneously transmitted by the other clients of the domain or in response to a request. The discovery phase can take place before or after the conflict is identified.

"Traffic management rule" refers to any traffic filtering action, as well as the set of administrative rules related to the security policy of the domain. Advantageously, a filter rule can be installed after a network attack is detected, to protect the client domain.

It is considered that there is a conflict between two traffic management rules of the client domain when they are incompatible with each other, i.e. one prevents the proper implementation of the other or the compliance with the security policy. Such a conflict can be detected independently of the discovery or from the information resulting from the discovery.

According to an embodiment of the invention, the discovery comprises sending at least one discovery request and receiving a response.

One advantage is that the first client node initiates the discovery when it needs it.

According to another embodiment of the invention, the request is transmitted to a server accessible to the client nodes of the domain.

Advantageously, the method for discovering the other client nodes of said client domain relies on the assistance of said server. One advantage is that the server knows all the client nodes active in the client domain.

Optionally, the first client node can specify a type of information required, for example in an information field called "request code", and get a targeted response. For example, if the request code takes the value 0, the client node wants to receive the identification of the client nodes for which the server maintains an active session or at least one entry corresponding to a traffic management rule.

Advantageously, the type of information required belongs to a group comprising at least:
  an identifier of the client node;
  an IP address of the client node;
  an active session maintained by the server;
  an entry maintained by the server corresponding to a management rule installed by the client; If all the client nodes of the client domain play the same role and have the same privileges, then any client node can access all the available information as known and maintained by the server.

If, on the contrary, the client nodes of said client domain have distinct roles and benefit from different privileges in terms of types of information that can be accessed, then the response transmitted by the server will contain only the information values corresponding to the required types that can be accessed.

Advantageously, the response obtained has a type belonging to the group comprising at least:
  a compact response, comprising an information field, called a response code, indicating a number of active client nodes responding to the request code;
  an elaborate response, comprising a list of client nodes responding to the request code, as well as the values of the types of information required for each client of said list.

According to a strategy, the response received by default from the server is a compact response. Depending on the response code received, and especially if the response indicates the presence of other client nodes, the first client node may send a second discovery request, for example to the other client nodes of the client domain, in order to obtain an elaborate response.

Advantageously, the server controls the information it returns to the client node, independently of the request code. For example, only the client nodes with privileges, such as the master nodes, receive the elaborate response. One advantage is to limit the distribution of sensitive information such as the identification of the clients or their IP addresses and thus prevent malicious clients from obtaining this information.

According to another embodiment of the invention, the discovery comprises receiving presence announcements from the discovered node on a multicast address.

Thus, the discovery is made between client nodes of the client domain by a presence announcement mechanism. One advantage is that the discovery is based on information spontaneously distributed by the other nodes of the domain.

According to another embodiment of the invention, the discovery request is transmitted to a multicast address or a preconfigured client and the presence announcements are received in response to said request.

One advantage of using a multicast address or the address of a preconfigured client, such as a master client, to ask other clients of the domain to announce themselves is to prevent malicious clients from sending incorrect responses to the requesting client in unicast.

This embodiment (intra-domain discovery) can be advantageously combined with the previous one (server-assisted discovery) to allow the first client to complete the information obtained. For example, if the server has only provided a compact response, it can then initiate a second discovery by domain name resolution in order to obtain the identification and location information of the other clients of the domain.

In particular, according to an embodiment of the invention, the multicast address is associated with a subset of the client nodes, called master clients, and, upon receipt of at least one presence announcement from a master client node of said domain, comprising at least one unicast IP address of the master node, the method comprises sending a second discovery request from the client nodes of the client domain to said at least one unicast IP address of the master client node.

According to this variant, when the domain distinguishes master nodes from the conventional client nodes, the intra-domain discovery is performed in two steps: first discovering at least one master node and obtaining a unicast address for that node, and then retrieving the information relating to the non-master client nodes of the domain that are known to the master node. Advantageously, the master node discovered the client nodes associated with the domain beforehand by querying the server and obtained complete answers. It is therefore able to respond to the discovery request from the first client node.

One advantage of this solution is that it is secure, as the master client node has full visibility into the clients of the domain and has previously obtained from the server the list of client nodes duly registered by the server. It can thus reject the discovery requests from malicious nodes.

According to an embodiment of the invention, the information obtained during the discovery comprising a list of discovered nodes and information relating to the management rules installed by the nodes of the list, the detection of the conflict comprises comparing the information obtained with locally available information and identifying in said list at least the discovered node that installed one of said rules.

One advantage of the discovery according to the invention is that it allows the first client node to compare the information retrieved during the discovery with information it already had, and thus to detect the existence of the conflict. If the information obtained is sufficiently complete, it can be used to detect a conflict and associate the problematic rule(s) with clients identified during the discovery.

Advantageously, the detected traffic management conflict highlights:
the presence of at least one inactive or malicious client node, that installed a second traffic management rule that conflicts with a rule of the administration or security policy of the domain. For example, the second rule is stale;
the existence of a conflict between a first rule that the first client node asks the server to install and a second rule already installed, associated with a discovered client.

According to another embodiment of the invention, the modification of said rule or of a state associated with said discovered node comprises sending to a server a request for modifying said rule or a state associated with said discovered node.

This embodiment relates particularly to a master client that has the privilege to modify a state of a client. For example, it can ask the server to modify the problematic rule or even to disconnect the client if it considers it as malicious.

According to yet another embodiment of the invention, the detection of the conflict comprises receiving a message rejecting an request for installing one of said rules from a management server for the traffic associated with the client domain, said message comprising an identifier of the other said management rule.

One advantage is that the client node can use the information obtained from the discovery to identify the client that installed the rule that conflicts with the one it wants to install.

According to yet another embodiment of the invention, if the other said rule was not installed by the discovered node, the resolution of the conflict comprises sending a request for determining an identity of the client node associated with the other said management rule to said discovered node.

Advantageously, when the discovery did not allow the first client node to obtain enough information about the other nodes of the domain to locally identify the node that installed the rule generating the conflict, the client requests the assistance of at least one of the discovered nodes. Advantageously, it sends the request to all the discovered nodes. Once it has retrieved the IP address of the associated client node, it can ask it to adjust its rule.

According to another embodiment of the invention, if the other said rule was installed by the discovered node, the modification of said rule comprises sending to the discovered node a request for adjusting said rule.

This embodiment is particularly adapted to a conventional client node. Associating a client with the problematic rule allows it to directly request the assistance of that node to resolve the conflict.

Correlatively, the invention also relates to a method for protecting a client domain, for example against a computing attack, implemented in a server or a client node, said method comprising:
receiving a discovery request from a client node of the client domain;
obtaining a record comprising at least one state associated with another client node of the domain, called a registered node; and
sending a response to the client node comprising at least one item of information relating to the registered node.

According to the invention, the server or the client node responds to the discovery request of the first client node of the domain by transmitting to it information about the other client nodes of the domain.

The invention also relates to a client node adapted to implement one or more methods for protecting a client domain, for example against a computing attack, according to any one of the particular embodiments defined above. This client node could, of course, comprise the different characteristics relating to the protection method according to the invention. Thus, the characteristics and advantages of this client node are the same as those of the protection method, and they are not detailed further.

The invention also relates to a server comprising at least one programmable computing machine or one dedicated computing machine, configured for example to protect a client domain against a computing attack, and implementing:

receiving a discovery request from a client node of the client domain;

obtaining a record comprising at least one state associated with another client node of the domain, called a registered node; and sending a response to the client node comprising at least one item of information relating to the registered node.

According to a particular embodiment, the invention also relates to one or more computer programs comprising instructions for implementing a method for protecting a client domain, for example against a computing attack, according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, or a magnetic recording means, for example a floppy disc or a hard drive. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Other characteristics and advantages of the invention will emerge more clearly upon reading the following description of a particular embodiment, provided as a simple illustrative non-restrictive example, and the annexed drawings, wherein:

FIGS. 8A to 8D illustrate different variants implemented by a client node to associate a management rule with a discovered client node;

FIGS. 9A and 9B illustrate two conflict resolution variants according to the fourth embodiment of the invention; and FIGS. 10 and 11 illustrate the simplified structures of a client node and a server according to a particular embodiment.

5. DETAILED DESCRIPTION OF THE EMBODIMENTS OF THE INVENTION

5.1 General Principle

The general principle of the invention is based on the discovery by a first client node belonging to a client domain of other client nodes belonging to the same client domain, the detection of a conflict between two management rules for the traffic associated with the client domain, the association of at least one of said rules with a client node of the client domain and the initiation of an action to resolve the detected conflict by modifying said rule and/or a state of the client, at least the detection or the resolution of the conflict implementing the information obtained during the process for discovering the nodes of the domain.

Figure 1:
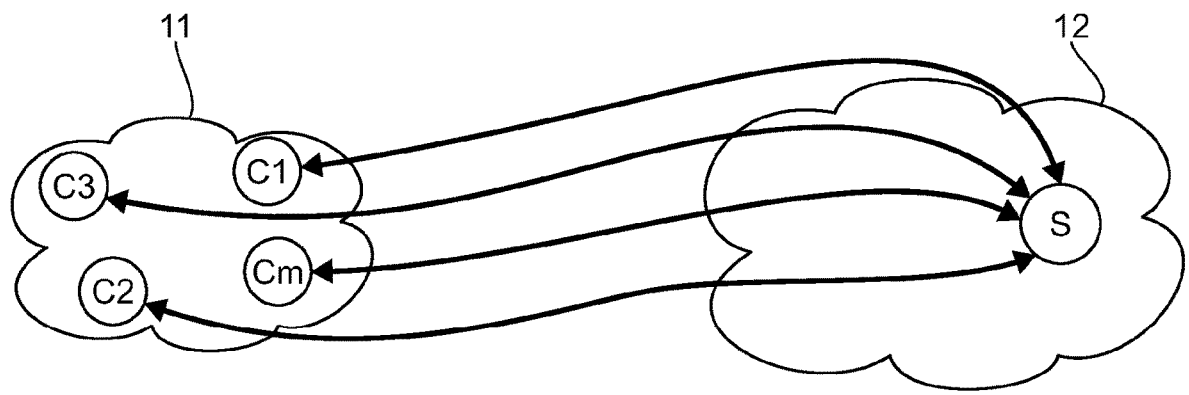
FIG. 1 illustrates an example of a communication network implementing a protection method, according to an embodiment of the invention.

In relation to FIG. 1, different equipment of a communication network implementing a method for protecting a network according to an embodiment of the invention is presented.

For example, several client nodes C1, C2, C3 and Cm belonging to a client domain 11, communicating with a server S, are considered. For example, the client domain 11 contains one or more machines, also called nodes. The term "domain" is used here to refer to a set of machines or nodes under the responsibility of the same entity.

According to the example illustrated, the server S does not belong to the client domain 11. According to another example not illustrated, the server S can belong to the client domain 11.

Embodiments of the invention in a DOTS-type architecture are described below, according to which the client nodes C1, C2, C3 and Cm are DOTS clients and the server S is a DOTS server. The client nodes C1, C2, C3, Cm and the server S can thus communicate via the DOTS signal and data channels defined in connection with the prior art to inform the server that protection actions are required (for example, the mitigation of attacks or the installation of filter rules).

5.2 Reminders of DOTS Architecture

A DOTS request can be, for example:

an alias management message, for example to associate an identifier with one or more network resources located in the client domain, a signalling message to request the mitigation of a denial of service attack from a DOTS server, with the server being able, upon receipt of such a message, to initiate the actions necessary to stop the attack, or a filter rule management message, such as soliciting a DOTS server to install (or have installed) an Access Control List (ACL).

A DOTS request can be sent from a DOTS client, belonging to a DOTS client domain, to a DOTS server or to a plurality of DOTS servers.

A DOTS domain can support one or more DOTS clients. In other words, several client nodes of a client domain can have DOTS functions.

DOTS communications between a client domain and a server can be direct, or established via DOTS gateways. These gateways can be hosted within the client domain, the server domain, or both. In other words, a node of the client domain can communicate directly with the server, or transmit a request to a gateway of the client domain that communicates directly with the server or to a gateway in the server domain, or transmit a request to a gateway in the server domain that communicates with the server.

A DOTS gateway located in a client domain is considered by a DOTS server as a DOTS client.

A DOTS gateway located in a server domain is considered by a DOTS client as a DOTS server. If there is a DOTS Gateway in a server domain, the authentication of DOTS clients can be entrusted to the DOTS Gateway of the server domain. A DOTS server can be configured with the list of active DOTS gateways within its domain and the server can delegate some of its functions to these trusted gateways. In particular, the server can securely use the information provided by a gateway on a list declared to and maintained by the server by means of an ad hoc authentication procedure (for example, explicit configuration of the list by the authorised administrator of the server, retrieval of the list from an authentication server such as an AAA server (for "Authentication, Authorisation and Accounting"), etc.).

The embodiments presented below can be implemented regardless of the configuration of the DOTS architecture (one or more DOTS clients in a client domain, no DOTS gateway, one or more DOTS gateways of the client domain or in the server domain, client domain separate from the server domain, etc.).

Figure 2:
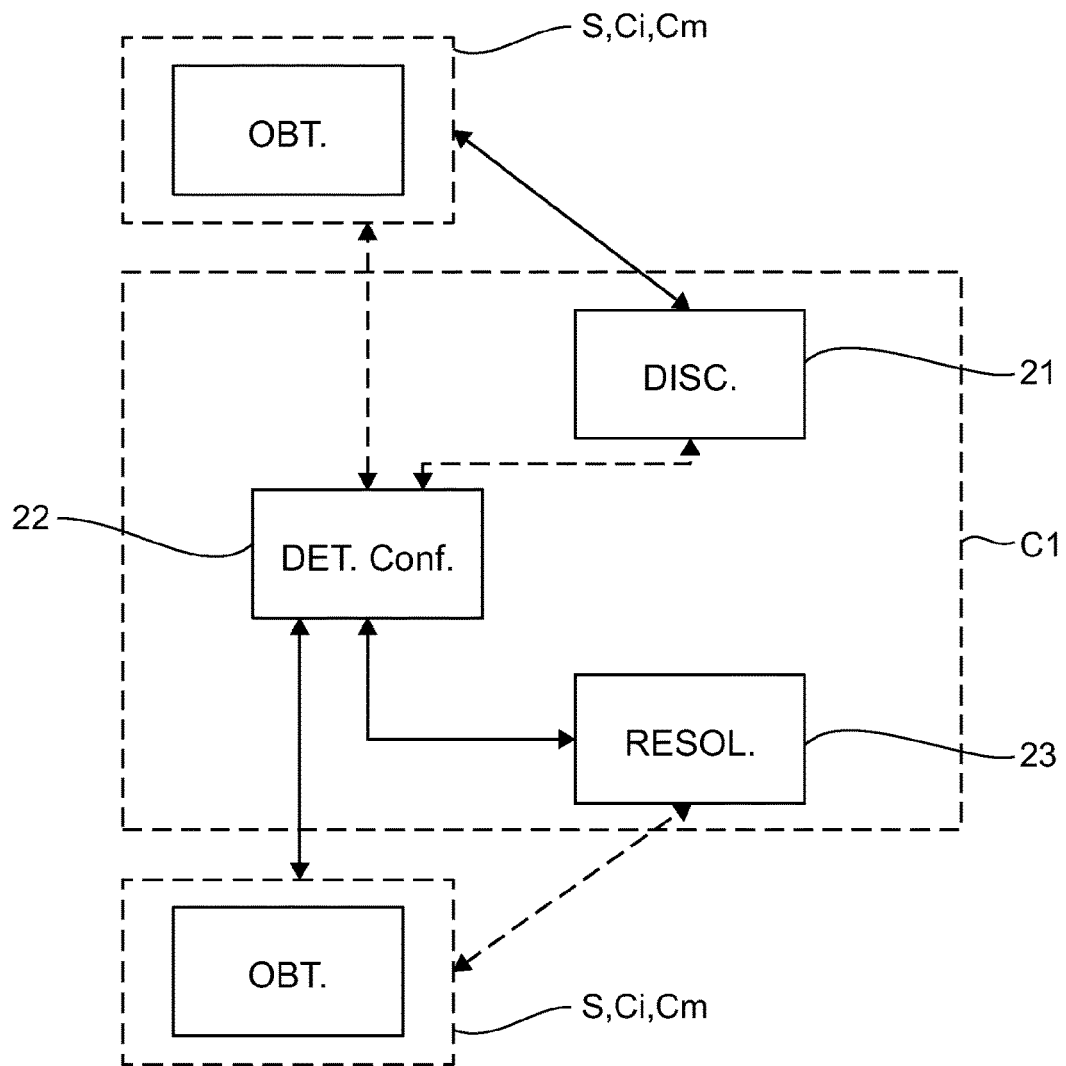
FIG. 2 shows the main steps of the protection method, according to at least one embodiment of the invention.

FIG. 2 illustrates the main steps implemented by one of the client nodes, for example the client node C1, for managing the traffic associated with the client domain 11.

The client node C1 discovers in 21 other client nodes active in the client domain 11 which it is part of. This discovery allows it to obtain information relating to the client nodes active in the domain. It involves the server S or one or more client nodes of the domain. Several embodiments will be detailed in the remainder of the description, in relation to FIGS. 3A to 3C and 4A-4B.

In 22, it detects a conflict relating to two management rules Rk1 and Rk2. The detection of the conflict may or may not be related to the information acquired during the process for discovering the other client nodes of the domain.

In the following, "management rule" designates any action initiated by a client node of the client domain to manage the incoming or outgoing traffic of that domain. It can be for example a filter rule, a mitigation action requiring the installation of one or more filter rules or any other resource. The installation of such a management rule leads to the creation of a state entry or, in other words, a record in a database maintained by the server. Such an entry describes the management rule and its status, and is associated with the client node at the origin of the request for installing the rule. In addition, the state of a client node registered with the server S refers to its activity in the network, such as whether or not the server maintains for that client node an active session in the network or at least one entry related to a traffic management rule installed by the client node.

Figure 5:
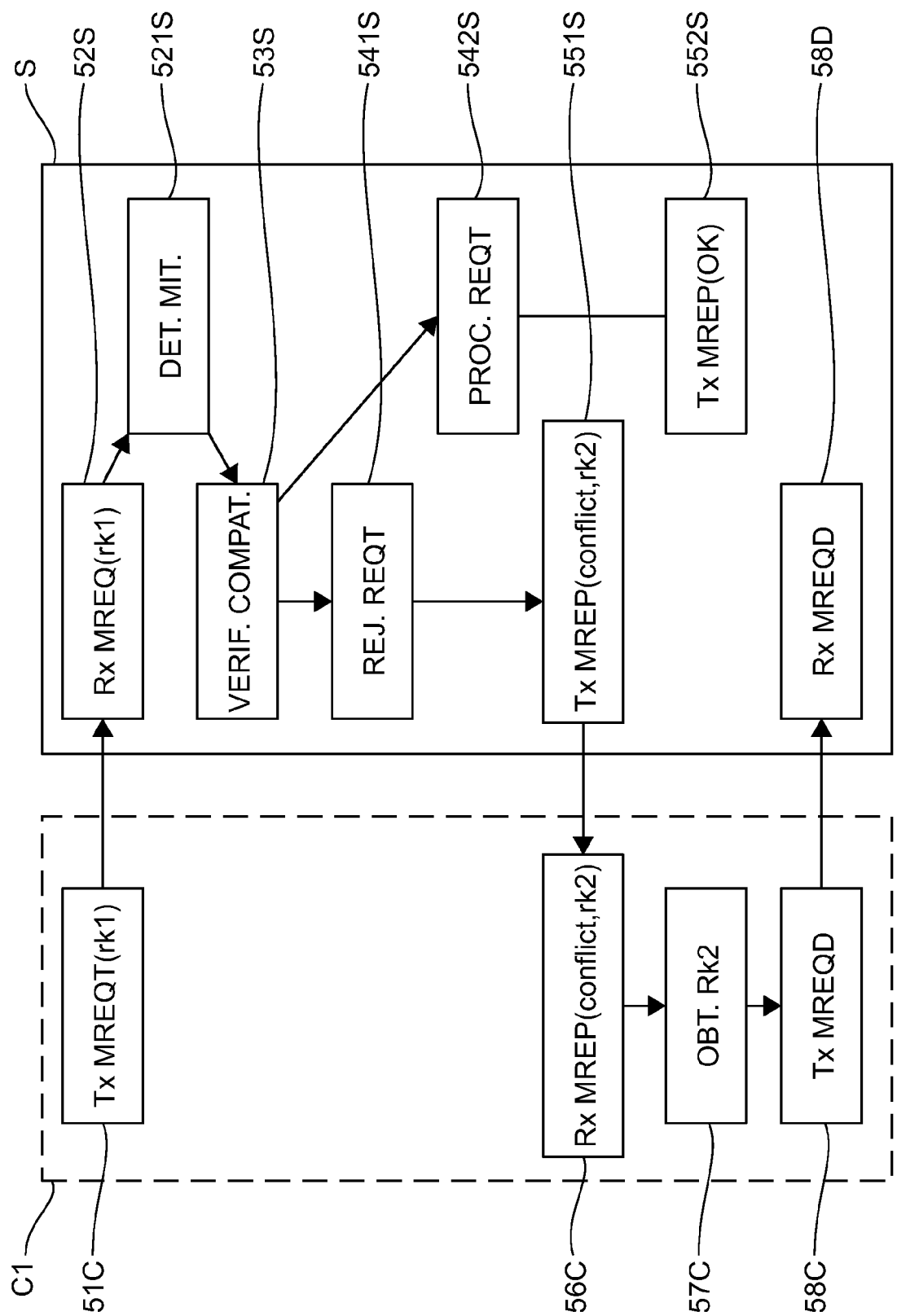
FIG. 5 illustrates the detection of a conflict between two traffic management rules according to a third embodiment of the invention.
Figure 6:
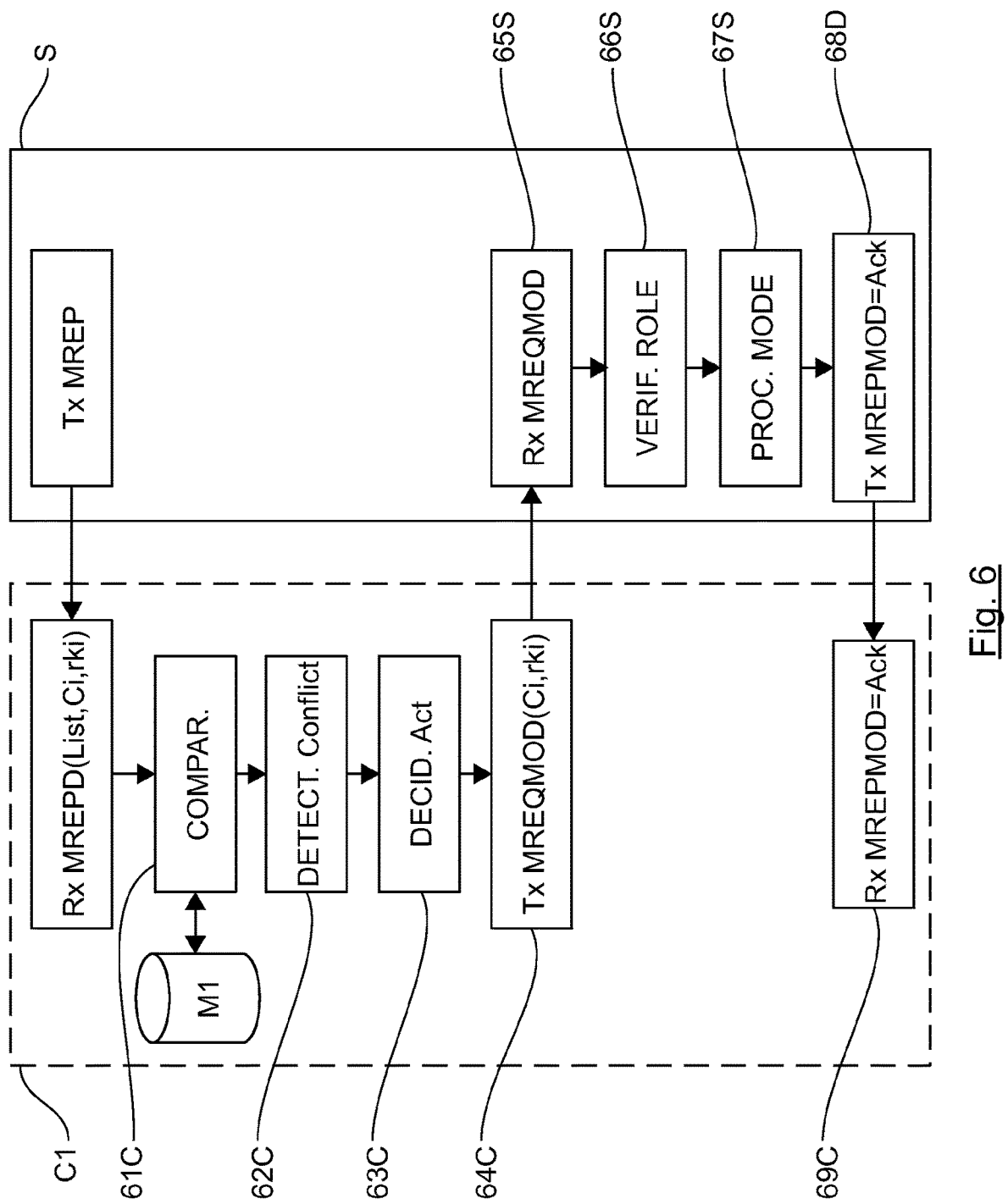
FIG. 6 illustrates the detection of a conflict between two traffic management rules according to a fourth embodiment of the invention.

Different embodiments will be detailed in relation to FIGS. 5 and 6.

Optionally, the client node C1 associates at least one of the management rules Rk1, Rk2 with a discovered client. Some embodiments will be detailed in relation to FIGS. 8A-8D and 9A-9B.

In 23, the client node C1 initiates a conflict resolution action with at least one other client node C2 that it discovered, or with the server S. The resolution action can either apply to a state of the client node C2 itself, when it is at the origin of the installation of the problematic management rule Rk2, or consist in requesting its assistance. Different embodiments will be detailed in relation to FIGS. 7A-7C and 9A-9B.

Figure 3A:
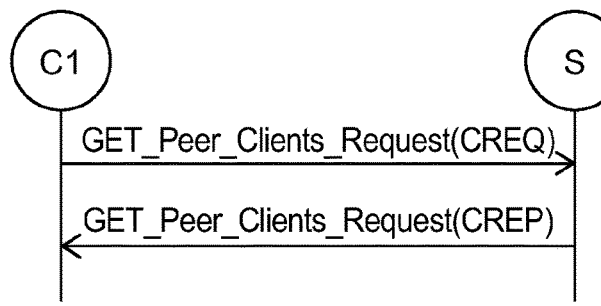
FIGS. 3A to 3C illustrate the discovery of the client nodes of a client domain by a first node according to a first embodiment of the invention.
Figure 3C:
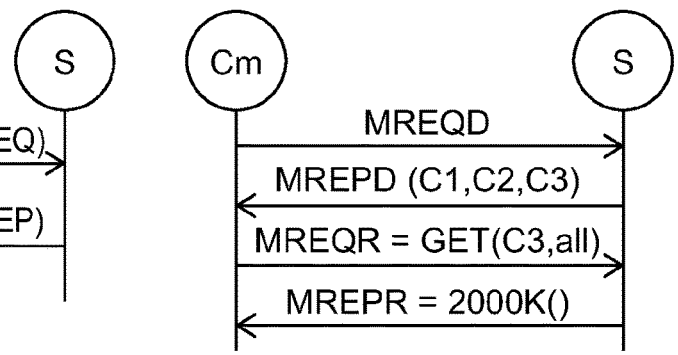
Figure 3B:
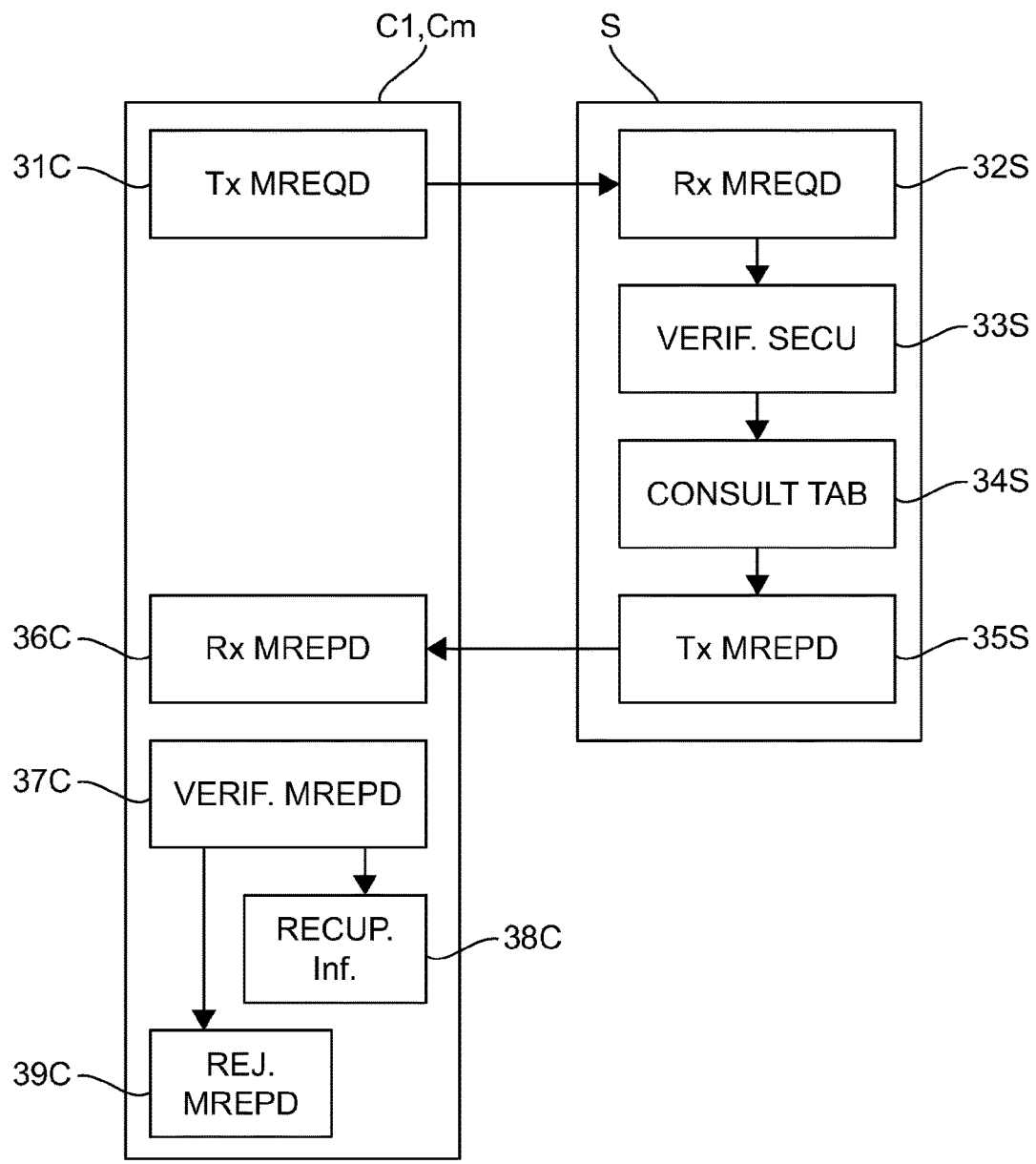

The step for discovering other client nodes according to a first embodiment of the invention, that requires the assistance of the server S12, is now detailed in relation to FIGS. 3A-3B. According to this embodiment of the invention, called "server-assisted" mode, the discovery comprises, as illustrated in FIG. 3A, sending by the client C1 in 31C an MREQD or "GET_Peer_Clients_Request" discovery request to the server S12 in order to retrieve a list of DOTS clients of the domain having at least one state instantiated by the server S. This request can be transmitted at initialization, or at regular intervals, or at any time, for example after a conflict is detected.

Advantageously, this request comprises a field, called a request code CREQ, that can take one of the following values:

- "0" to get the list of all the DOTS client nodes belonging to the same domain as the client node C1 for which the DOTS server S maintains an active session or at least one state, such as a filter rule;
- "1" to get the list of all the DOTS client nodes belonging to the same domain as the client node C1 for which the DOTS server S maintains an active session;
- "2" to get the list of all the DOTS client nodes belonging to the same domain as the client node C1 for which the DOTS server S maintains at least one state, such as a filter rule;
- "3" to get the list of all the DOTS client nodes belonging to the same domain that have established a contact with the server since the timestamp indicated by the "timestamp" field.

In relation to FIG. 3B, upon receipt 32S of the MREQD request sent by the client node C1, the server S performs security checks in 33S. Indeed, it is assumed that the DOTS agents (client and server) authenticate each other. There is therefore a secure communication channel of type DTLS or TLS ((Datagram) Transport Layer Security) for example between a client and a server. Thus, messages received from another server impersonating the legitimate server can be rejected by a DOTS client. Similarly, the requests from the DOTS clients not authorised to access the mitigation service can be ignored by the DOTS server. It is assumed in what follows that this procedure is implemented by the DOTS agents. The details of the DTLS/TLS exchanges, and those concerning the management of the security keys for the mutual authentication of the DOTS clients, are not the subject of the present invention and are not detailed here.

Then, the server S12 checks in 34S one or more tables stored in memory by applying a search filter corresponding to the "request code".

For example, a DOTS server identifies the DOTS clients belonging to the same domain by a domain identification item of information called a CDID (Client Domain IDentifier) attribute. Of course, other mechanisms can be supported by the server. Alternatively, the domain identifier can be calculated locally by the server from identity information of type certificate or key, such as the "Pre-Shared Key (PSK) identity" information, and/or communicated by another trusted entity (typically a DOTS relay of its domain). No assumptions are made about the structure of the domain identifier.

As an example, an example of a message relayed by a DOTS relay of the server domain is shown below. Said relay inserts the "cdid=here.example" information to communicate to the server the identity of the domain of the DOTS client that transmitted to it a discovery request. This information is used by the server to enforce policies such as applying quotas or limiting the number of requests per client domain.

```
Header: PUT (Code=0.03)
Uri-Host: "www.example.com"
Uri-Path: ".well-known"
Uri-Path: "dots"
Uri-Path: "v1"
Uri-Path: "mitigate"
Uri-Path: "cdid= here.example"
Uri-Path: "cuid= cuid_ex1"
Uri-Path: "mid=57956"
Content-Format: "application/cbor"
{
    "ietf-dots-signal-channel:mitigation-scope": {
        "scope": [
            {
                "target-prefix": [
                    "1.2.3.0/24",
                ],
                "target-port-range": [
                    {
                        "lower-port": 80
                    }
                ],
                "target-protocol": [
                    6
                ]
            }
        ]
    }
}
```

An example of an extract of a list of DOTS clients as maintained by a server is now presented in relation to table 1. The two client nodes identified by "cuid_ex1" and "cuid_ex2" belong to the same client domain identified by "here.example".

Note that the invention is not limited to a particular structure of the state table maintained by the server. For example, a server can index the clients by their identifiers, group them by client domain, etc.

TABLE 1

| Client Identifier (cuid) | Client Domain Identifier (cdid) | ... |
|---|---|---|
| cuid_ex1 | here.example | ... |
| cuid_ex2 | here.example | ... |
| cuid_ex3 | there.example | ... |

According to a first embodiment variant of the invention, the server responds in 35S to the client node C1 with an MREPD or "GET_Peer_Clients_Reply" response message comprising a list of identifiers of the DOTS clients associated with the client domain as well as the information used (typically, the IP address used by a DOTS client) to contact the server. It will be noted that other information useful for conflict detection and resolution can be returned by the server. This version of the "GET_Peer_Clients_Reply(List (cuid, IP address), [Additional_Information])" response message is called an elaborate response.

However, this information can be used by a malicious DOTS client to discover the identifiers of all the legitimate DOTS clients of a DOTS domain: the malicious client could thus use this information to disrupt the DOTS service offered by these clients.

To prevent these problems, a second variant consists in the DOTS server responding by default in 35S with the GET_Peer_Clients_Reply(response code, [Additional_Information]) message to communicate the minimum information to the requesting client. This version of the GET_Peer_Clients_Reply( ) message is called a compact response.

According to a first option, the server systematically responds with the compact response of GET_Peer_Clients_Reply( ) The compact response includes a response code CREP that indicates whether other clients are known to the server. Typically:

"0": is returned to the requesting client if and only if only the requesting client is known to the server.
"1": is returned to the requesting client if other DOTS clients match the filter indicated in the request. Additional information such as the number of these clients or the number of active states they maintain can be returned.

The location or identification information of the DOTS clients is not shared in order to limit other forms of identity theft by the malicious clients.

Depending on the code indicated in the response, the client can restart a discovery procedure within the domain to obtain additional information.

According to a second option, and in order to prevent this discovery feature from being used by malicious clients, the access to an elaborate response comprising sensitive information (such as the clients' identities or their IP addresses) is restricted to the DOTS clients having a certain privilege or role. This role can be assigned by the administrator of the client domain and shared with the DOTS server during the phase of subscription to the DOTS service. It can be restricted to one or more DOTS clients of a domain.

The master DOTS clients are the clients selected to play this role. In the following, and for illustration purposes, it is assumed that the role of a DOTS client is deduced by the server by correlating the information presented by the DOTS client for its authentication to the server with information pre-recorded by the server.

Thus the DOTS server responds with the elaborate version of the "GET_Peer_Clients_Reply( )" message if and only if the requesting client is a master DOTS client. Otherwise, the compact version is returned by default. The DOTS server can also be configured to only return a response to a defined set of DOTS clients of a client domain; the requests from clients not belonging to this set being rejected.

Using this procedure, the master DOTS clients can retrieve the list of DOTS clients associated with the domain. Additional information that characterises the activity of these clients is available to the master DOTS clients.

By default, in an operating mode without a master client, all the DOTS clients of a client domain play the same role and access the elaborate response.

Upon receipt of the MREPD response in 36C, the client C1 checks in 37C if this response matches a request that it sent and is waiting for a response. If the check was successful, the client retrieves in 38C the information included in the message; otherwise the message is rejected in 39C.

In relation to FIG. 3C, it is assumed that the discovering client is a master client Cm. If it has not obtained all the information relating to the resources associated with the client nodes in the MREPD response received from the server S, it can, once it has retrieved the list of identifiers of the clients active in the domain, send to the server S an additional MREQRk or "GET(c3, all)" request to request the rehoming of the list of filtering entries, registered IP resources, etc., associated with the DOTS client C3 of the domain.

---

GET /restconf/data/ietf-dots-data-channel:dots-data\
  /dots-client=cuidc3/access-lists?content=all HTTP/1.1

---

This message sent by the master client Cm specifies the identifier of the client C3 and indicates that it wants to rehome all the data (operation and configuration) associated with the client C3, as specified by the value of the "content" parameter set to "all".

Upon receipt of this message by the DOTS server, the latter returns the complete list of resources Rk associated with the client C3.

Figure 4A:
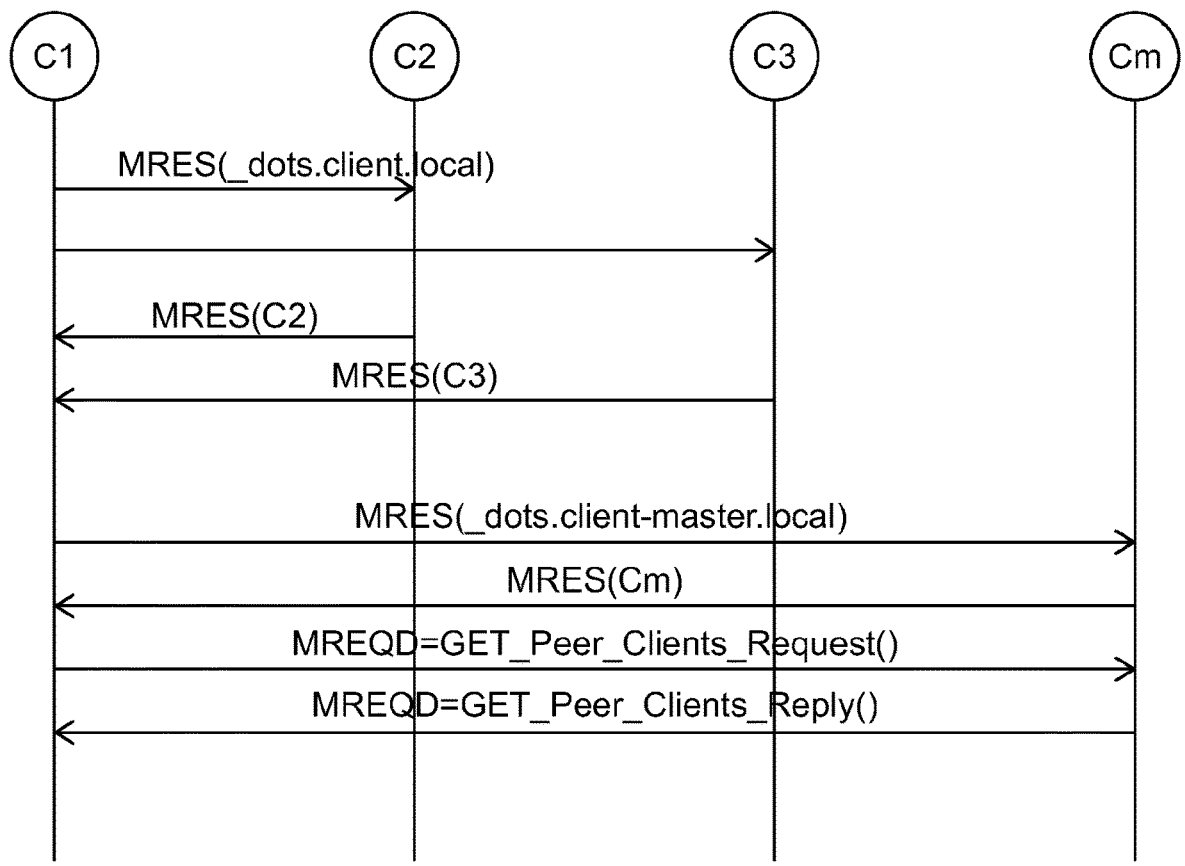
FIGS. 4A and 4B illustrate the discovery of the client nodes of a client domain by a first node according to a second embodiment of the invention.

In relation to FIG. 4A, the step for discovering other client nodes according to a second embodiment of the invention, called "client-initiated-discovery" mode, is now detailed.

According this embodiment of the invention, the discovery 21 comprises receiving presence announcement messages from DOTS clients of the client domain. These DOTS clients announce their presence either at initialization, or at regular intervals, or in response to an explicit request. The clients must notably announce their presence without waiting for a request from the other DOTS clients of the domain at reboot and whenever their IP address(es) change(s).

They also discover the other DOTS clients active within the client domain. It is assumed, for example, that the multicast transfer mode is used. In particular, the resolution protocol mDNS, as specified in the document RFC 6762, can be used.

It is assumed that the DOTS client C1 of the client domain wants to discover the clients of its domain at a given instant. According to this embodiment, as illustrated in FIG. 4A, it sends an MRES request to one of the multicast addresses defined by RFC 6762 to request the resolution of the name "_dots._client.local.".

Upon receipt of this message by another DOTS client of the domain, for example the client C2, it responds in unicast or multicast, announcing its presence. The MPRES response message comprises the location information of the client C2.

Figure 4B:
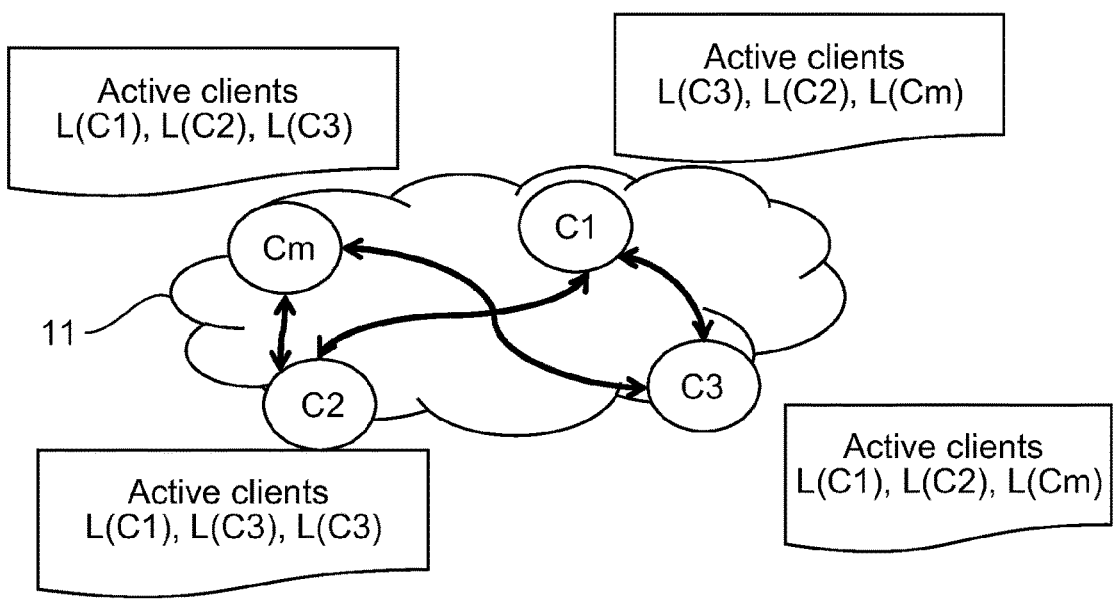

At the end of this procedure, as illustrated in FIG. 4B, all the DOTS clients of the domain are identified and known to all the clients of this domain. Of course, the malicious clients can decide not to participate in this announcement procedure since it could reveal their presence.

A variant also illustrated in FIG. 4A consists in discovering the master clients first. To do this, a DOTS client sends a PTR (PoinTer Record) type domain name resolution MRES request to a multicast address defined by RFC 6762 to request the resolution of the name "_dots._client_master-.local.". Upon receipt of this message by another DOTS client of the domain that acts as the master DOTS client, it must respond in multicast to announce its presence. The location information is included in the MPRES response to the mDNS resolution request.

The announcement response is transmitted to the client C1 exclusively in multicast to prevent the malicious clients from sending incorrect responses directly to the unicast address.

As already mentioned above, the master clients must announce their presence regularly and spontaneously, without waiting for a request from the other clients.

At the end of this procedure, the client C1 has the information to contact at least one master client Cm of the domain.

According to this second embodiment of the invention, the discovery advantageously comprises a second phase that consists for the client node C1 in contacting the master client Cm it discovered in order to retrieve the complete list of DOTS clients of the domain.

Advantageously, the DOTS client C1 implements the first embodiment of the invention and sends the MREQD or GET_Peer_Clients_Request( ) discovery request message to a master client it identified during the first phase. Upon receipt of the message, the master client responds with an MREPD or GET_Peer_Clients_Reply( ) message including the list of other active DOTS clients of the domain.

As illustrated in FIG. 4B, once all the clients of the domain have performed the discovery just described, they have the list of active clients of the domain including those acting as master clients. According to the invention, this information is then used by the clients to detect and resolve conflicts related to the installation of incompatible traffic management rules.

The detection 22 of a conflict between traffic management rules is now described in relation to FIGS. 5 and 6. At least two cases are considered:

according to a third embodiment of the invention, the client node C1 detects the conflict in 22 independently of the discovery 21.

In relation to FIG. 5, it is assumed that it has previously transmitted in 51C an MREQT processing request to the server S. This request relates to the installation of a traffic management rule Rk1. Upon receipt of this request in 52S, the server S12 checks in 53S whether this request for installing the rule Rk1 is compatible with the management rules already installed in the client domain. It is assumed that it detects a conflict with another management rule Rk2 and rejects the request in $54_1$S. It then responds to the client C1 in $55_1$S with an MREPT message comprising a rejection of this processing request. The MREPT response indicates the existence of the conflict with the rule Rk2 installed by another client of the same client domain and specifies an rk2 attribute identifying that rule Rk2. If, on the contrary, it finds no incompatibility between the rule Rk1 and rules already installed for the same client domain, it installs the rule Rk1 in 542S and sends an MREPT response to the client C1 in 551S confirming its installation.

According to another example, the client C1 previously detected a traffic characteristic of an attack, and the MREQT processing request comprises a mitigation request for this attack. Upon receipt of this request in R2S, the server S determines in 521S a mitigation solution for this attack. It is assumed to comprise the installation of at least one management rule Rk1. The next steps already described are unchanged.

Upon receipt in 56C of the MREPT rejection message, the client C1 obtains in 57C the identifier rk2 of the rule Rk2, but it does not know the identity of the client that installed it. It therefore initiates the discovery step 21 described above, to obtain information about the other clients active in the client domain. For example, it sends in 58C an MREQD discovery request to the server S. As a variant, it implements a multicast address resolution to discover one or more master clients Cm; according to a fourth embodiment of the invention illustrated in FIG. 6, the detection 22 of a conflict between management rules for the traffic associated with the client domain is performed by using the information relating to the other clients, and obtained during the discovery 21. For example, the client node C1 receives the MREPD response message from the server S 12 in 60C, extracts the identification, location and state information received for each of the client nodes registered with the server S and compares it in 61C with information locally stored in memory M1. "Locally available information" refers to the identification, location, activity information already recorded for the client nodes of the domain, the information or rules relating to the administration and security policy of the client domain. The client node C1 uses this comparison to detect for example in 62C a conflict between a second rule Rk2 installed by a client C2 and a first rule related to the traffic management security policy in the client domain.

It is understood that the information received during the discovery must relate to all the client nodes active in the client domain, including the malicious nodes, and be sufficiently complete, and notably include the entries relating to management rules installed (filter rules, mitigation requests, etc.) by the clients discovered and maintained by the server. In this way, the master client can identify the client that installed a particular management rule.

This embodiment is therefore particularly adapted to a master client node Cm and to a discovery in "server-assisted" mode. Indeed, the "client-initiated-discovery" local procedure does not allow conclusions to be drawn about the presence of malicious DOTS clients within a client domain because they can be programmed to ignore the requests sent by the other clients of the domain. Advantageously, the discovery information is then used in 22 to:

Identify the presence of malicious DOTS clients (or "hidden" DOTS clients) activated within the DOTS domain. It is for example a client that is not supposed to connect to the server, but for which the server maintains an active session;

Identify the presence of malicious DOTS clients activated from a network external to the DOTS client domain. This abnormality is easily detected based on the IP address used by the DOTS client to establish a DOTS session. This address is not a spoofed address because the establishment of a DOTS session is based on acknowledgements sent by the DOTS agents as part of the mutual authentication procedure;

Identify the DOTS clients with suspicious activity. For example, a DOTS client may have installed traffic management rules that do not comply with the local policies of the client domain, i.e., that conflict with local administrative or security rules of the client domain;

Identify "amnesic" DOTS clients, i.e. DOTS clients that have installed states, but do not bother to delete them from the DOTS server. It is for example management rules they have installed but not deleted. It can also be a mitigation request that is still in progress, but without any associated lifespan.

Figure 7A:
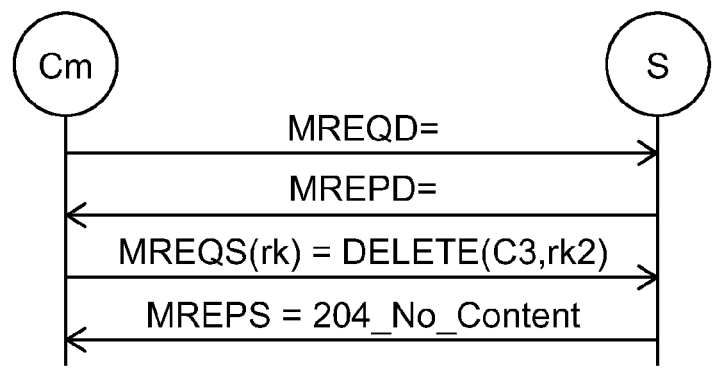
FIGS. 7A to 7C illustrate different conflict resolution variants according to the third embodiment of the invention.
Figure 7B:
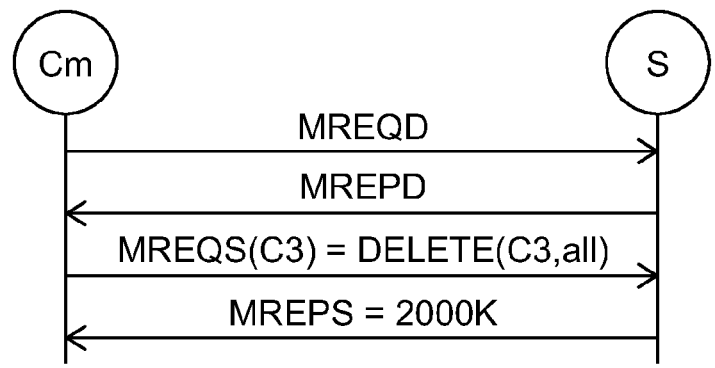
Figure 7C:
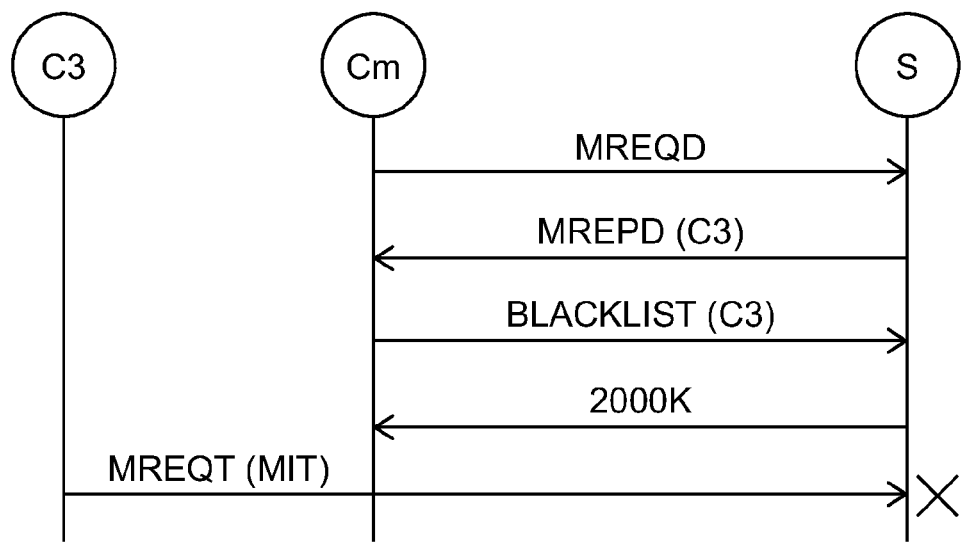

The resolution 23 of a detected conflict is now detailed in relation to FIGS. 7A to 7C.

According to the third embodiment of the invention, the case where the detection of conflicts 22 performed based on the information resulting from the discovery led the client C1 to identify a malicious or amnesic client C3 is considered.

Advantageously, the client C1 is a master client Cm with privileges, including the ability to ask the server to modify the state of another client node of the client domain 11.

For example, the initiated action 24 consists in:

Deleting one or more entries associated with a DOTS client: The master DOTS client detected that although they are maintained by the server for the client C3, they are incorrect. In relation to FIG. 7A, an MREQS or DELETE(C3, rk2) request for deleting the rule(s) Rk2 corresponding to this/these entry/entries associated with the client C3 is transmitted by the master client Cm to the server S. Such a request indicates the identifier of the client C3 and specifies that all the entries that are associated with it must be deleted. For example, the DELETE message can be formatted as follows:

```
DELETE /restconf/data/ietf-dots-data-channel:dots-data\
  /dots-client= cuidc3/access-lists\
  /acl=wrong-ipv4-acl HTTP/1.1
```

Upon receipt of this message, the server deletes the filter rule RK2="wrong-ipv4-acl" associated with the client C3. The problems related to "stale" entries can be solved by implementing this procedure.

Disconnecting a DOTS client detected as inactive, for which stale (because the client is inactive) management rules remain installed within the domain. In relation to FIG. 7B, an MREQS or DELETE(C3, all) request deleting the client C3 is transmitted by the master client Cm to the server S. It indicates the identifier of the client C3 and specifies that all the resources that are associated with it must be deleted. For example, the DELETE message can be formatted as follows:

```
DELETE /restconf/data/ietf-dots-data-channel:dots-data\
  /dots-client=cuid-c3 HTTP/1.1
```

Upon receipt of this message, the server disconnects the client C3. As a result, no entries are maintained any longer by the server for this client.

migrating one or more entries associated with a DOTS client before disconnecting it:

furthermore, if the master client identifies, among the management rules installed by the client C3 and maintained by the server, entries that should be maintained, despite the disconnection of the client C3, the master client Cm can ask the server to migrate these entries to one or more other clients of the domain. Another use case is, for example, that of a major software update procedure for the client node C3, during which all or part of the entries corresponding to management rules installed by the client C3 must be maintained by a "backup" client. Advantageously, the migration can be implemented thanks to a new update procedure based on the PUT method. A first embodiment of a migration request for all the rules initially instantiated by the client C3 to the client C2 is presented below:

PUT /restconf/data/ietf-dots-data-channel:dots-data/dots-client=cuidc2/acls acl=cuidc3-acls HTTP/1.1

Another embodiment of the migration procedure is deleting the rules to be migrated using an MRES or DELETE deletion request as described above, then immediately sending PUT/POST request(s) for creating the same rules, but associated with a new client identifier (c2).

blacklisting the DOTS client by sending a "BLACKLIST (C3)" message to the server S, as illustrated in FIG. 7C;

The BLACKLIST( ) message sent by the client Cm comprises an identifier of the client C3, for example of type cuid. Upon receipt of this message, the server S deletes all the states associated with the client C3 and adds C3 to a blacklist. As a result, no states are maintained any longer by the server for this client and it will no longer be able to establish a DOTS session with the server. Its session establishment requests will systematically be rejected by the DOTS server.

Advantageously, the DOTS master client can repeat the method according to the invention until all the abnormalities are resolved.

According to the fourth embodiment of the invention, the case of a client C1 that detects a conflict between management rules, upon receipt of a refusal from the server S to process its MREQT request, is considered, as described in relation to FIG. 5. Advantageously, the MREPT response received in 56C can indicate to it an identifier rk2 of the management rule Rk2 at the origin of the conflict with the rule Rk1 it wanted to install. The inclusion of this identifier in the refusal message of the server S is not mandatory to initiate the conflict resolution procedure.

Alternatively, the client C1 uses the information (for example, the IP prefixes) sent in the server response to identify the rule Rk2 at the origin of the conflict.

It is assumed that the client C1 identified the other clients active in the domain during a discovery 22, but it does not know which of them the problematic management rule Rk2 should be associated with, for example because it does not have this type of information about the other client nodes.

Figure 8C:
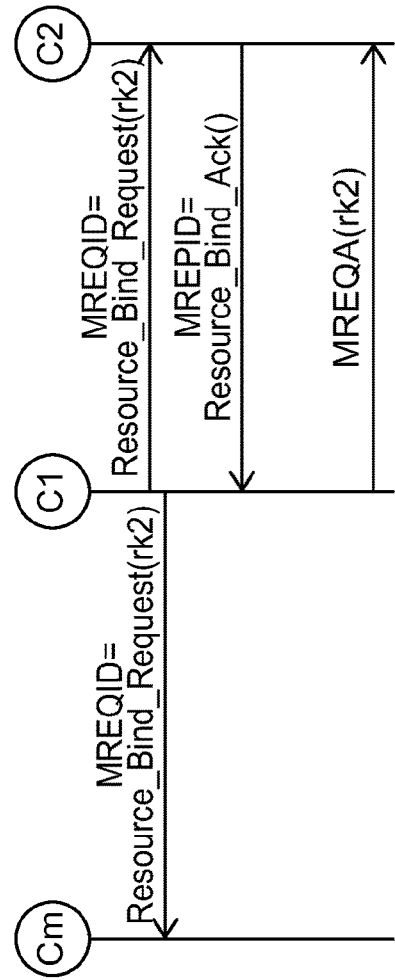
Figure 8C:
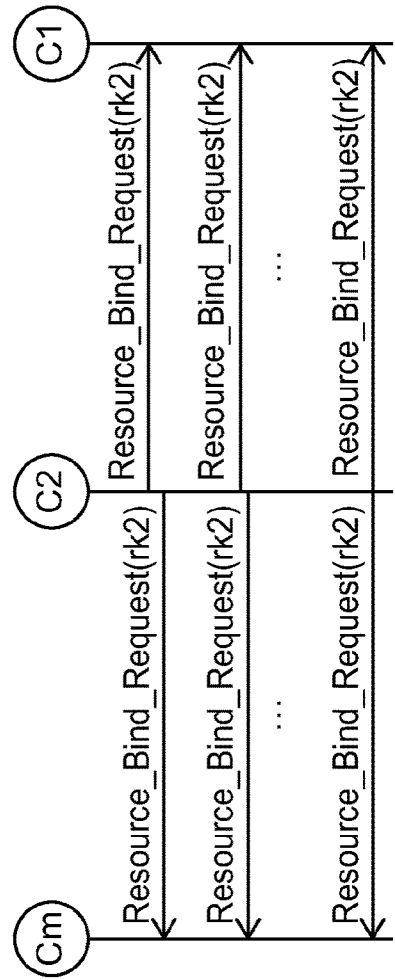
Figure 8C:
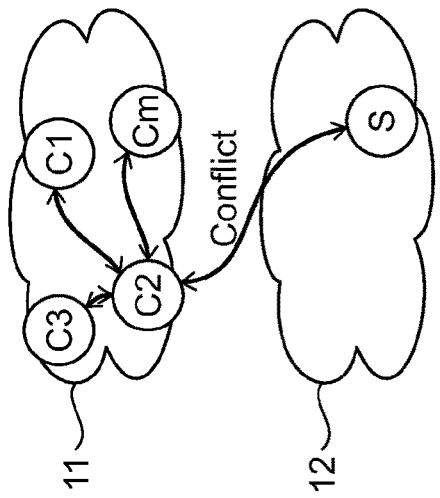

To resolve the conflict, the client node C1 must identify the client of the domain that installed the rule Rk2 corresponding to the identifier rk2. If it did not obtain enough information during the discovery, the client C1 requests the assistance of the clients of the domain it discovered. As an example, it may adopt one of the following behaviours:

Contact a master client of the domain, as illustrated in FIG. 8A;

Contact all the clients of the domain in multicast, as illustrated in FIG. 8B;

Contact all the clients of the domains using the unicast addresses discovered in the previous steps, as illustrated in FIG. 8C.

In relation to FIG. 9A, the client C1 sends to the clients of the domain an MREQID or "Resource_Bind_Request (rk2)" determination request, specifying the management rule Rk2 concerned by an rk2 attribute. This attribute is for example an IP prefix, a domain name, a filter rule, etc. One or more management rules can be specified in a request.

Two cases are distinguished:

Case 1: at least one client of the domain, for example the client C2 or the master client Cm, is responsible for the management rule Rk2 or knows the identity of the client associated with this rule. It responds with an MREPD or "Resource_Bind_Ack(ci)" message, indicating at least the identifier ci of the client concerned Ci. As an example, the client C1 then checks the table of active clients it maintains to deduce the IP address associated with the identifier ci obtained.

In the following it is assumed that the client C3 is responsible for the management rule Rk2. The exchanges between the client C1 and the client C3 are detailed in relation to FIG. 9B. In order to identify the client of the client domain that installed the rule Rk2, the client C1 transmits in 81C1 an MREQID(rk) request message for identifying the client that installed the rule Rk2. The message is received by the client C3 in 82C3. It checks its tables and ensures that it installed this resource Rk2 itself in 83C3. It responds to the client C1 in 84C3 with an MREPID message comprising the identifier c3.

The client C1 receives this response in 85C1 and uses the identification information obtained to request the assistance of the client C3 by transmitting to it in 86C1 an MREQA or "Resource_Adjust_Ack(rk2)" resource adjustment request. It comprises at least one rk2 attribute that specifies the resource concerned Rk, as well as other information such as an item of information relating to the nature of the conflict or a request for modifying the scope of the rule or a conflict resolution proposal suggested by the client C1. Upon receipt of this message in 87C3, the client C3 performs in 88C3 local checks to determine the actions required to resolve the conflict. For example, the client C3 can, in a non-exhaustive way:

Ask the server in 89C3 to delete the entry corresponding to the rule Rk2 with an MREQS(rk2) delete request message;

If the rule Rk2 is a filter rule, ask the server to modify its scope with an MREQM(rk2) modification request message.

It will be noted that the client node C3 may decide to follow the resolution proposal proposed by the client C1 or, on the contrary, decide on another action.

The server S receives the request in 90S, performs the usual not shown check operations and processes the request in 91S. It transmits in 92S an MREPS or MREPM response confirming the processing. Once the confirmation is received from the server in 93C3, the client C3 responds to the client C1 in 94C3 with an MREPA or "Resource_Adjust_Ack( )" message to indicate to it that it has taken steps to resolve the conflict. The client C1, upon receipt of the confirmation response in 95C1, resends in 96C1 its MREQT processing request to the server, which will be able to process it successfully this time.

Figure 8D:
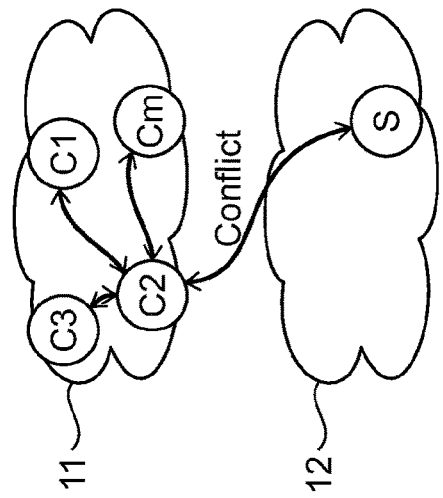
Figure 9B:
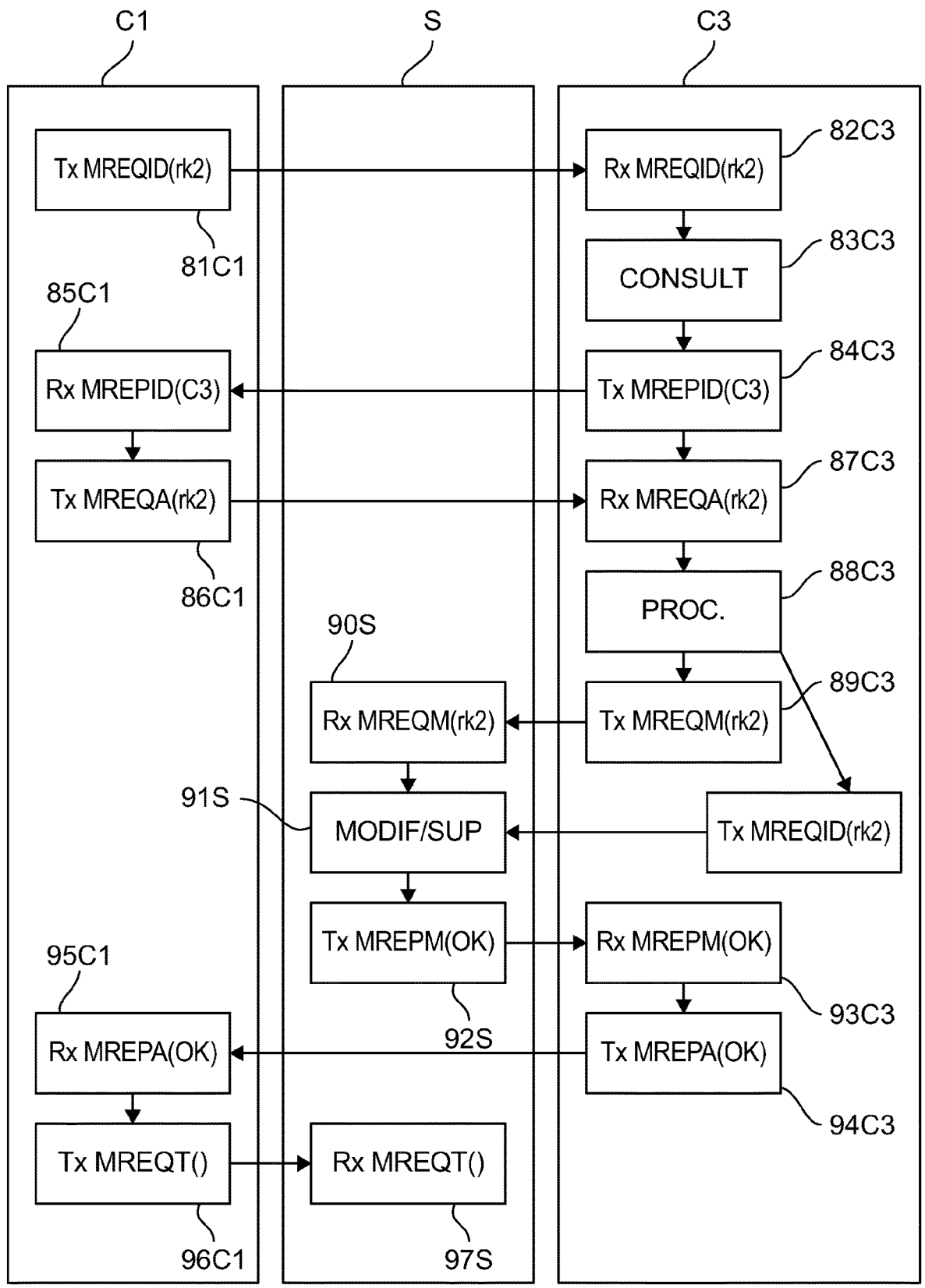

Case 2: as illustrated in FIG. 8D, no response is received after a predetermined time period, despite the repeated resend operations of the MREQID message by the client C1. This absence of response, and the fact that the master client itself does not know the client associated with this resource, are indicative of an abnormality in the management of the traffic of the domain, that the master client Cm according to the invention should be able to detect and resolve.

Advantageously, the master client Cm of the domain takes the actions necessary to resolve this abnormality. For example, it asks the server to delete the resource Rk2 that is not associated with any client. As a variant, if it considers that the resource in question should be maintained, it requests its migration to a client of the domain, as previously mentioned.

If the resource is deleted, the client C1 can resend its MREQT processing request, initially refused, that will be honoured by the server this time. If the resource Rk2 has been re-allocated by the master client Cm to another client of client domain 11, it can repeat its MREQID identification request to the other clients of the domain in order to identify the new entity in charge, then proceed according to case 1.

5.2 Structures

Finally, a description is given, in relation to FIG. 10, of the simplified structure of a client node and a server according to one of the embodiments described above.

According to a particular embodiment, a client node comprises a memory $101c$ comprising a buffer memory, a processing unit $102c$, equipped for example with a programmable computing machine or a dedicated computing machine, for example a processor P, and controlled by the computer program $103c$, implementing steps of the protection method according to an embodiment of the invention.

At initialisation, the code instructions of the computer program $103c$ are for example loaded into a RAM memory before being executed by the processor of the processing unit $102c$.

The processor of the processing unit $102c$ implements steps of the protection method previously described, according to the instructions of the computer program $103c$, to:
Discover at least one other client node of said client domain, called a discovered node;
Detect a conflict between at least two management rules for the traffic associated with said client domain; and
Resolve the detected conflict, comprising:
if one of said rules was installed by the discovered node, modifying said rule or a state associated with said discovered node;
otherwise, obtaining, from said discovered node, an item of information for identifying at least the node of the client domain that installed one of said rules.

According to a particular embodiment, a server S or a client node C2,C3,Cm comprises a memory $111_{S,C}$ comprising a buffer memory, a processing unit $112_{S,C}$, equipped for example with a programmable computing machine or a dedicated computing machine, for example a processor P, and controlled by the computer program $113_{S,C}$, implementing steps of the protection method according to an embodiment of the invention.

At initialisation, the code instructions of the computer program $113_{S,C}$ are for example loaded into a RAM memory before being executed by the processor of the processing unit $112_S$.

The processor of the processing unit $112_{s,c}$ implements steps of the protection method previously described, according to the instructions of the computer program $113_{s,c}$, to:
receive a discovery request from a client node of the client domain;
obtain a record comprising at least one state associated with another client node of the domain, called a registered node; and
send a response to the client node comprising at least one item of information relating to the registered node.

The invention claimed is:

1. A method for protecting a client domain, implemented in a client node of the client domain, said method comprising:
discovering at least one other client node of said client domain, called at least one discovered node;
detecting a conflict between at least two management rules for traffic associated with said client domain; and
resolving the detected conflict, comprising:
if one of said rules was installed by said at least one discovered node, modifying said one of said rules which was installed by said at least one discovered node or a state associated with said at least one discovered node;
if one of said rules was not installed by said at least one discovered node, obtaining, from the at least one discovered node, an item of information for identifying at least one node of the client domain that installed one of said rules;
wherein the detecting and/or resolving said detected conflict comprises detecting and/or resolving said detected conflict using information obtained during the discovery of said at least one other client node of the client domain.

2. The method for protecting a client domain according to claim 1, wherein the discovery comprises sending at least one discovery request and receiving a response.

3. The method for protecting a client domain according to claim 2, wherein the at least one discovery request is transmitted to a server accessible to the client nodes of the client domain.

4. The method for protecting a client domain according to claim 2, wherein the discovery request is transmitted to a multicast address or a preconfigured client and in that the presence announcements are received in response to the request.

5. The method for protecting a client domain according to claim 4, wherein the multicast address is associated with a subset of the client nodes, called master clients, and, upon receipt of at least one presence announcement from a master client node of the client domain, comprising at least one unicast IP address of the master client node, the method comprises sending a second discovery request from the client nodes of the client domain to the at least one unicast IP address of the master client node.

6. The method for protecting a client domain according to claim 1, wherein the discovery comprises receiving presence announcements from the discovered node on a multicast address.

7. The method for protecting a client domain according to claim 1, wherein the information obtained during the discovery comprising a list of discovered nodes and information relating to the management rules installed by the nodes of the list, the detection of the conflict comprises comparing the information obtained with locally available information and identifying in the list at least the discovered node that installed one of the rules.

8. The method for protecting a client domain according to claim 7, wherein the modification of the rule or of a state associated with the discovered node comprises sending to a server a request for modifying the rule or a state associated with the discovered node.

9. The method for protecting a client domain according to claim 1, wherein the detection of the conflict comprises receiving a message rejecting a request for installing one of the rules from a management server for the traffic associated with the client domain, the message comprising an identifier of the other the management rule.

10. The method for protecting a client domain according to claim 9, wherein, if the other the rule was not installed by the discovered node, the resolution of the conflict comprises sending a request for determining an identity of the client node associated with the other the management rule to the discovered node.

11. The method for protecting a client domain according to claim 9, wherein, if the other the rule was installed by the at least one discovered node, the modification of the rule comprises sending to the discovered node a request for adjusting the rule.

12. A method for protecting a client domain, implemented in a server or a client node, the method comprising:
receiving a discovery request from a client node of the client domain;
in response to said receiving, obtaining, within a database comprising records associating some states and corresponding client nodes, where a state refers to an activity of the corresponding client node in a network, a record comprising at least one state associated with another client node of the client domain, called a registered node; and
sending a response to the client node comprising at least one item of information relating to the registered node.

13. A client node comprising at least one programmable computing machine or one dedicated computing machine, implementing:
discovering at least one other client node of a client domain, called a discovered node;
detecting a conflict between at least two management rules for traffic associated with the client domain; and
resolving the detected conflict, comprising:
if one of the rules was installed by the discovered node, modifying the rule which was installed by the discovered node or a state associated with the discovered node;
if one of the rules was not installed by the discovered node, obtaining, from the discovered node, an item of information for identifying at least one node of the client domain that installed one of the rules;
the detecting and/or resolving comprising detecting and/or resolving the detected conflict using information obtained during the discovery of at least one other client node of the client domain.

14. A server comprising at least one programmable computing machine or one dedicated computing machine implementing:
receiving a discovery request from a client node of a client domain;
in response to said receiving, obtaining, within a database comprising records associating some states and corresponding client nodes, where a state refers to an activity of the corresponding client node in a network, a record comprising at least one state associated with another client node of the client domain, called a registered node; and
sending a response to the client node comprising at least one item of information relating to the registered node.

15. A non-transitory computer-readable medium comprising a computer program product stored thereon comprising program code instructions for implementing a method for protecting a client domain, implemented in a client node of the client domain, when the instructions are executed by a processor of the client node, wherein the instructions configure the client node to:
discover at least one other client node of said client domain, called at least one discovered node;
detect a conflict between at least two management rules for traffic associated with said client domain; and
resolve the detected conflict, comprising:
if one of said rules was installed by said at least one discovered node, modifying said one of said rules which was installed by said at least one discovered node or a state associated with said at least one discovered node;
if one of said rules was not installed by said at least one discovered node, obtaining, from the at least one discovered node, an item of information for identifying at least one node of the client domain that installed one of said rules;
wherein the detecting and/or resolving said detected conflict comprises detecting and/or resolving said detected conflict using information obtained during the discovery of said at least one other client node of the client domain.

16. A system in a communication network comprising:
a client node comprising at least one programmable computing machine or at least one dedicated computing machine, implementing:
discovering at least one other client node of a client domain, called at least one discovered node;
detecting a conflict between at least two management rules for traffic associated with the client domain; and
resolving the detected conflict, comprising:
if one of the rules was installed by the at least one discovered node, modifying the one of the rules which was installed by the at least one discovered node or a state associated with the at least one discovered node;
if one of the rules was not installed by the at least one discovered node, obtaining, from the at least one discovered node, an item of information for identifying at least one node of the client domain that installed one of the rules;
the detecting and/or resolving comprising detecting and/or resolving the detected conflict using information obtained during the discovery of the at least one other client node of the client domain,
a server comprising at least one programmable computing machine or at least one dedicated computing machine implementing:
receiving a discovery request from the client node of the client domain;
obtaining a record comprising the at least one state associated with another client node of the client domain, which corresponds to the discovered node and is called a registered node; and
sending a response to the client node comprising at least one item of information relating to the registered node.

* * * * *